(12) United States Patent
Sebastian et al.

(10) Patent No.: US 10,951,269 B2
(45) Date of Patent: Mar. 16, 2021

(54) SMART PACKAGING AND DISPLAY SYSTEM

(71) Applicants: R. J. Reynolds Tobacco Company, Winston-Salem, NC (US); IMEC Taiwan Co., Hsinchu (TW)

(72) Inventors: Andries Don Sebastian, Winston-Salem, NC (US); Rajesh Sur, Winston-Salem, NC (US); Percy Phillips, Pfafftown, NC (US); Chung-Hsuan Yeh, Hsinchu (TW)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 0 days.

(21) Appl. No.: 16/388,402

(22) Filed: Apr. 18, 2019

(65) Prior Publication Data
US 2019/0326954 A1 Oct. 24, 2019

Related U.S. Application Data

(60) Provisional application No. 62/660,711, filed on Apr. 20, 2018.

(51) Int. Cl.
| | | |
|---|---|---|
| *H04B 5/00* | (2006.01) | |
| *G06K 7/10* | (2006.01) | |
| *H04Q 1/22* | (2006.01) | |
| *G08B 13/14* | (2006.01) | |
| *G06F 3/0484* | (2013.01) | |

(Continued)

(52) U.S. Cl.
CPC ......... *H04B 5/0031* (2013.01); *G06F 3/0484* (2013.01); *G06K 7/10237* (2013.01); *G06K 19/0723* (2013.01); *H01Q 1/2208* (2013.01)

(58) Field of Classification Search
CPC ....... H04B 5/0031; G06F 3/0484; G06F 3/14; G06K 7/10237; G06K 19/0723; H01Q 1/2208; A47F 1/04; A47F 5/00; G08B 13/14; G06Q 30/00; G06Q 30/06; G06Q 10/08; H04W 4/80; G09F 3/02
See application file for complete search history.

(56) References Cited

U.S. PATENT DOCUMENTS

| | | | |
|---|---|---|---|
| 7,957,833 B2* | 6/2011 | Beucher | G06Q 10/08 |
| | | | 700/215 |
| 9,519,904 B2* | 12/2016 | Bright | A61J 1/00 |
| 10,130,195 B2* | 11/2018 | Phillips | A47F 5/00 |

(Continued)

*Primary Examiner* — Pablo N Tran
(74) *Attorney, Agent, or Firm* — Burr & Forman, LLP (57) ABSTRACT

A smart packaging system and a smart display system and methods relating thereto are disclosed herein. In various embodiments, the packaging system may include an inner package, an outer package, and an identification tag disposed between said inner package and said outer package. Said identification tag may be a radio-frequency identification (RFID) tag, a near-field communication (NFC) identification tag, or any variation thereof. In various embodiments, the display system may include a display shelf for positively positioning a plurality of product packages, at least one near-field communication antenna, and a control system. Each of said plurality of product packages may include said identification tag. Said control system may transmit and receive product information data to and from said identification tag for each of said plurality of product packages.

19 Claims, 5 Drawing Sheets

(51) Int. Cl.
*H01Q 1/22* (2006.01)
*G06K 19/07* (2006.01)

(56) References Cited

U.S. PATENT DOCUMENTS

| | | | | |
|---|---|---|---|---|
| 2002/0109593 | A1* | 8/2002 | Swartzel | G06Q 10/087 340/540 |
| 2006/0103532 | A1* | 5/2006 | Van Fleet | G06K 7/10178 340/572.1 |
| 2011/0022488 | A1* | 1/2011 | Tanaka | G06Q 20/20 705/25 |
| 2014/0043162 | A1* | 2/2014 | Siciliano | B65D 83/12 340/568.8 |
| 2016/0316938 | A1* | 11/2016 | Cruttenden | A47F 1/125 |

* cited by examiner

SMART PACKAGING AND DISPLAY SYSTEM

BACKGROUND

The present system is related generally to a display and tracking system for products and associated information related to those products. More specifically, the system described herein relates to a smart retail display that provides for tracking and control of retail products by the individual package, and a system for providing individual product packaging that is capable of being tracked to provide real-time sales and inventory feedback to a product wholesaler, distributor and/or retailer. The disclosure also relates to systems and apparatus for providing product information to a consumer and is further related to theft detection of retail products.

Retail outlets like department stores, specialty shops, and supermarkets sell an enormous variety of products, from electronics to food. The largest retail outlets utilize many different strategies to attract and inform consumers to purchase products. Providing consumers with information relating to promotional offers and marketing information for a product is highly desirable from a sales and marketing perspective. Furthermore, tracking product sales in real-time by various sales metrics is also crucial to a business' ability to control costs and maximize profits.

Many products and items are prepared for sale and marketing in individual packaging units, and then shipped in bulk, for example by the carton, box, or crate. Some of these products are particularly susceptible to theft or use by unauthorized users simply due to their nature and size. For example, cigarettes and other highly regulated tobacco products are expensive to produce and sell, and are subject to various tax and distribution laws that makes the distribution chain of the product critical to control. Additionally, the small size of an individual package of cigarettes makes them particularly susceptible to theft.

Currently, many such products have stamps or other identifiers situated on a portion of the packaging. Tobacco products and other heavily regulated items fall into this category. Additionally, many consumer items, such as electronics and digitally distributed movies and games, are sold having a radio-frequency identification (RFID) tag or label affixed to a portion of the outer packaging through the use of a strong adhesive, or the equivalent. By using these various prior art tracking devices and systems, retailers can provide a modicum of product tracking and inventory which is usually necessary when selling heavily regulated products, or products that are subject to frequent theft or piracy.

RFID technology utilizes electromagnetic fields to transfer data and the associated RFID tag can be either active or passive. An active RFID tag has a power source which allows transmission from the RFID tag to a RFID tag reader, whereas a passive RFID tag does not require a power source and the RFID tag is read by a RFID tag reader. RFID systems are classified by the type of tag or label and the reader they utilize, i.e., whether the RFID tag and/or the RFID tag reader is either active or passive. The tag is embedded within a particular product and consists of at least two parts: an integrated circuit for processing and storing information and for modulating and demodulating a radio-frequency (RF) signal; and at least one antenna and transceiver or EMF generator may be provided for transmitting and receiving the RF signal. The RFID tag reader communicates with the RFID tag by transmitting and receiving encoded RF signals that contain a corresponding RFID tag's unique identifier and additional product-related information specified by a user. The RFID tag's unique identifier may be at least one of: a serial number or the product-related information, data about the product type, brand, quantity, or any one of many aspects of the product being retailed. Due to the RFID tag's unique identifiers assigned to an individual product or package, an RFID system is able differentiate between different products and the product-related data when the RFID tag is within the range of the RFID tag reader.

RFID systems are sometimes classified by the type of tag and the type of tag reader the system utilizes which include: a passive reader-active tag (PRAT) system; an active reader-passive tag (ARPT); and an active reader-active tag (ARAT). Passive reader-passive tag (PRPT) systems are necessarily unsuitable for use with the system disclosed because either the RFID tag or the RFID tag reader must be active for communication between them to occur. Passive RFID tags are small in size and relatively inexpensive to manufacture in quantity, and embedding them within a product or package for tracking is well-known in the art. RFID systems are employed in a diverse number of fields which include: shipped package tracking, electronic retail package tracking, and even tracking of automotive traffic for uses such as tolling roads and bridges. RFID frequency bands begin at 120 kilohertz (kHz) and extend to 10 gigahertz (GHz). Near-field communication (NFC) is a sub-set of RFID technology, which operates at 13.56 megahertz (MHz), and thus the same classifications based on the type of tag and the type of tag reader can be applied to NFC systems.

NFC is a form of high frequency RFID communication that allows at least two devices to communicate with one another when they are within a particular proximity of one another. Like RFID systems, NFC systems utilize electromagnetic fields to transfer data both to and from one device to another device and can be either active or passive. NFC is typically considered a short-range wireless technology which allows for peer-to-peer communication; however, large NFC networks can be created by the strategic placement of NFC tags and NFC tag readers. Smartphones, smart watches, tablets, or any device that utilizes NFC, WLAN, or any other communication link equipped with a NFC tag and an antenna may utilize NFC as a method of communication with a device located in suitable proximity.

Current systems of product tracking and theft detection in these retail settings typically utilize an antenna or a similar wireless communications protocol to detect an activated tag or label affixed to a product that is exiting the store. These RFID and NFC systems usually provide a deactivator used by a clerk to deactivate the tag at the point of sale, so that the deactivated tag does not trip an alarm proximate the store exits.

Some prior art systems utilize retail shelves or displays having some product tracking capability using NFC to interact with a tag affixed to the product. One such exemplary system is disclosed in commonly-owned U.S. patent application Ser. No. 14/947,747 entitled "Smart System For Smart Retail Display" the entirety of which is incorporated by reference. These prior art systems are capable of some product tracking by incorporating an RFID tag reader to monitor the presence of an individual tagged product and then noting its absence during or after its removal from the display. However, many prior art systems suffer from the inability to track multiple product packages, and are also incapable of tracking and reporting data related to product sales and distribution in real-time.

SUMMARY

This disclosure is directed generally to methods and apparatus that provide a retail display and packaging system for a product by utilizing a smart packaging system and a smart retail display system to provide information to consumers, retailers, and producers of a product. In accordance with some aspects, a smart product package (referred to hereinafter as a packaging system) is positioned on a smart near-field communication (NFC) display (referred to hereinafter as a smart display or simply a display) which accommodates various product packages. The display system relates to technology which allows transmission of product identification and tracking data, product sales verification, inventory data, marketing information, etc. to both consumers and retailers. The smart retail display system includes a packaging system (or a plurality thereof) with an NFC tag, or a radio-frequency identification (RFID) tag, a display including a control system, a plurality of antennae for reading and writing data to the packaging system(s), and a database to collect, analyze, and store data related to the product. The system may further include a user controlled external device such as a smartphone, a smart watch, a tablet, or any device that utilizes NFC, wireless local area network (WLAN) communication, or any other communications system, wired or wireless.

In some embodiments, the systems and methods described herein may each include one or more of the following features. A smart display shelf, or a display shelf, may have a plurality of components including a controller that may comprise, but is not limited to, a microprocessor or controller for executing commands, and both data and random access memory (RAM) to store a plurality of commands for the system to execute. The display shelf may further include the plurality of antennae, or optionally an antenna array, for NFC read/write communications, and a communication link to facilitate transmission of data between the product packaging system, the display system, the database for storing and collecting product sales information, and optionally a consumer operated external device. In further embodiments, the system includes a smart display system that is capable of being operated to track product sales with limited retailer involvement or activity, and which can be operated or interacted with from a remote location. A server and concomitant database may be coupled to a plurality of smart displays, and at least one or more microprocessors are configured to control a plurality of smart displays and track each of the suitably equipped product packages contained or placed therein.

A smart packaging system may utilize an NFC tag, or more generally, an RFID tag positively positioned on a predetermined portion of at least one product package to collect, analyze, and store product-related data associated with the particular product, and for locating the particular product in real-time. For example, a product package may include an NFC tag placed on a predetermined location that is proximate the plurality of antennae or the antenna array, which may then be read to track the product to a point of sale. Once a purchase takes place, the tag registers a sale corresponding to a unique product or package identifier in a database of product information. Additional exemplary embodiments may incorporate real-time monitoring of product inventory and real-time product tracking, thereby permitting a retailer to track a particular product (or brand) and enabling a consumer to find a particular product in a particular retail outlet.

In accordance with further embodiments, a product packaging system can include an inner package, an outer package, and an identification tag positioned in a predetermined location in between the inner package and the outer package to facilitate positive positioning of the product package within the smart display system. The identification tag may be one of an identification tag, an NFC tag, an RFID tag, or any other type of tag that is capable of storing product data and being interrogated and/or written to via NFC communication. The tags used in the packaging system may include stored information relating to inventory identification, brand identification, product identification, marketing information, or any of a broad array of information related to the product being sold. Tags are capable of being written to and read by the smart display system, thereby providing real-time sales and inventory information to a central server and concomitant database via NFC, WLAN, or any other communications link. Additionally, product-related data may be read from the product package using a consumer device, such that a consumer may examine the product and make an informed purchasing decision. In one non-limiting exemplary embodiment, a packaging system may contain a tobacco product and the information contained on the identification tag may include advertising or other product related information which allows the consumer to make an informed purchasing decision prior to purchase.

In various aspects, an active or passive tag, NFC tag, or RFID tag may be utilized herein as it allows the tag to simultaneously behave as both a receiver and a transmitter, thereby communicating between at least one smart display and the product packaging system. In some embodiments, the smart display may include a plurality of spaced slots of package containers shaped or adapted to hold a plurality of packaging systems in the smart display system, such that the product packaging system may have at least one product package location positively positioned proximate the transponder antenna or other communications link of the display control system. The simultaneous reception and transmission of data allows for product inventory and sales data to be dynamically updated as product sales occur and sold packing systems are removed from the display, while new inventory is placed in the display.

As used herein for purposes of the present disclosure, the term "wireless transmitter" generally describes apparatus and systems relating to the wireless transmission of a signal. Any of a wide variety of wireless transmission devices and communications protocols may be employed, including analog and digital transmission systems. Exemplary wireless transmitters that may form a part of the disclosure include, but are not limited to, radio transmitters, cellular transmitters, LTE and LTE advanced systems, ZigBee™, Wi-Fi, and Bluetooth transmitters. Additionally, a plurality of wireless network and transmission systems may be employed without departing from the scope hereof. These include, but are not limited to, wireless personal area networks, local area networks, mesh networks, metropolitan area networks, and global area networks.

The term "processor", or alternatively "controller", is used herein generally to describe various apparatus relating to performing one or more functions stored in a memory. The controller can be implemented in numerous ways (e.g., such as with dedicated hardware) to perform various functions discussed herein. The processor is one example of the controller which employs one or more microprocessors that may be programmed using software (e.g., microcode) to perform various functions discussed herein. The controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a user or operator and one or more devices that enables interaction between the user and the device(s). Examples of the user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), smartphones, smart watches, tablets, personal computing platforms, touch screens, microphones, and other types of sensors that may receive some form of human-generated stimulus and generate a signal in response thereto.

The term "communications link" is generally meant to include devices having a communications link, in digital or other communication, with any other part of the system via a wireless or wired communication protocol. The communications link may be between two devices or components and may be accomplished by a separate networking system. The communications link may be provided to transfer data between a product packaging system, a smart display, a server, a database or other inventory control system, a consumer operated external device, a wireless local area network (WLAN), or any other communication system. The communications link disclosed and described in this specification may be integrated within various system components such as the packaging system(s), the display system(s), the shelf or the drawer structure, and the like, or alternatively may be a separate electronic system. The communications link may also encompass the transceivers and the data storage system responsive to wireless interrogators, thereby becoming active only when exposed to an electromagnetic energy field.

As used herein the term "tag" or "ID tag" refers to an RFID tag, an NFC tag, or a Si NFC tag, although a wide variety of known electronic tag systems may be employed without departing from the scope hereof.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and form a part of the specification illustrate exemplary, but non-limiting embodiments of the disclosure, and together with the description, serve to explain the principles of the disclosure.

Those skilled in the art will appreciate that the inventive concepts and principles upon which the disclosure is based may readily be utilized as a basis for designing other structures, systems, methods, and articles of manufacture for implementing the purposes of the present disclosure. Accordingly the claims appended hereto should be construed to include such equivalent constructions without departing from the spirit and scope herein.

DETAILED DESCRIPTION

Reference will now be made in detail to the present embodiments of the disclosure, certain non-limiting examples of which are illustrated in the accompanying drawing Figures.

Figure 1:
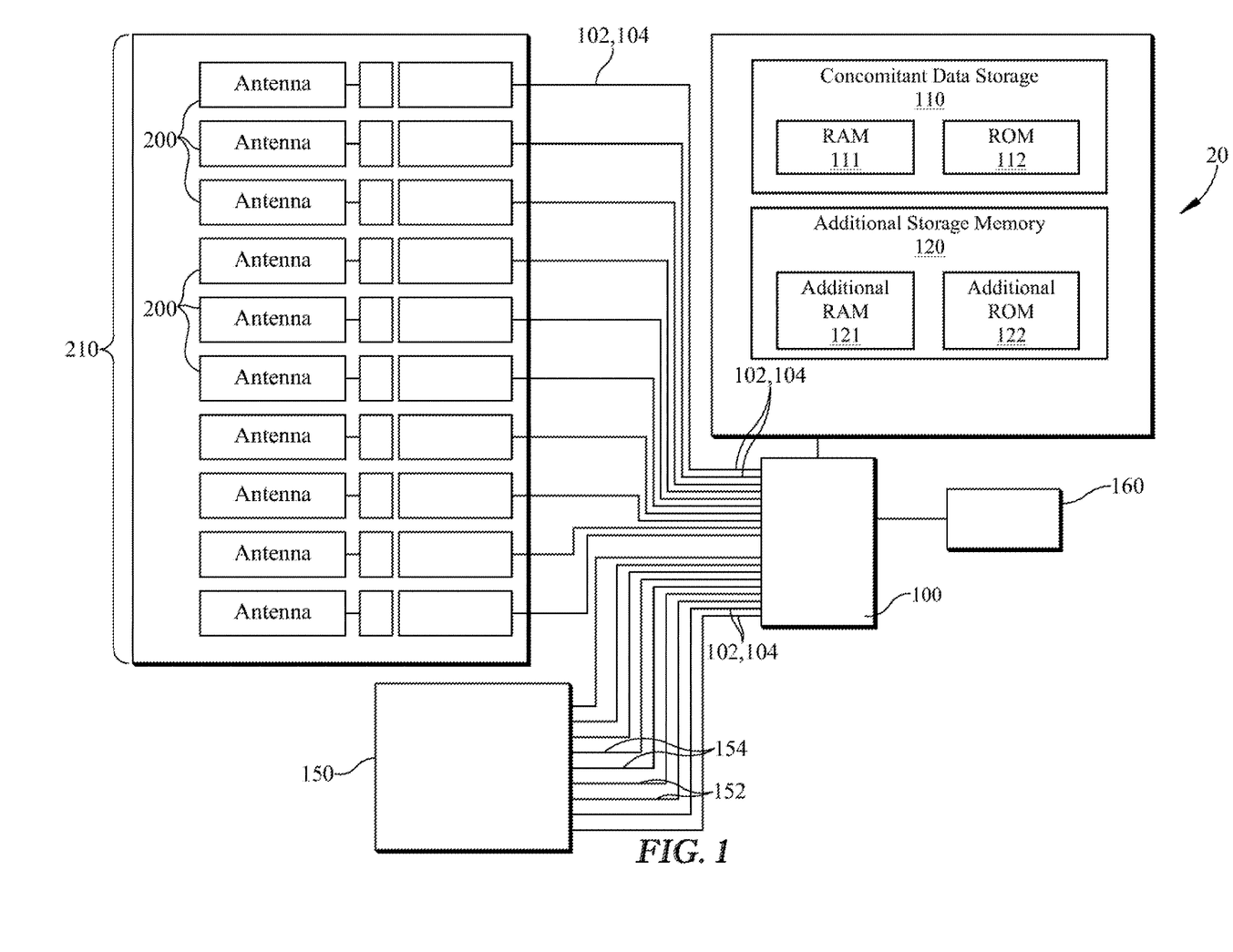
FIG. 1 illustrates an exemplary system implementing embodiments and features of the present disclosure.

Referring now to FIG. 1, and in accordance with some embodiments, a system, sometimes called a "smart" system, for storing and tracking a plurality of product packages 1 is shown. In various embodiments, the system may include a control system 20 having a processor or controller 100, for example a microcontroller having a plurality of electrical signal inputs 102 and outputs 104 that may be operatively coupled to various components of the system described herein. The controller 100 may be operatively coupled to a concomitant data storage 110 memory having both a random access memory (RAM) 111 and a read only memory (ROM) 112, and further, may also be operatively coupled to an additional storage memory 120 for storing and using data acquired during operation of the system. The additional storage memory 120 can include a number of separate memories including an additional RAM 121 for storage of instructions and data during operation of the controller 100 and an additional ROM 122 in which fixed instructions may be stored.

In various aspects, the system includes a user interface 150 that may include a display screen or screens, a touch sensitive screen, a plurality of buttons or option selector switches, a keypad, a keyboard, or a touch sensitive pad to enable a user to configure the system for use and to track packages during sale and inventory. The user interface 150 may further include a speaker or audible alarm to alert or notify a user of certain prompts or actions. The user interface 150 includes a plurality of outputs 152 operatively coupled to processor inputs 102 for providing instructions to the system, while a plurality of processor outputs 104 are provided to an input or inputs 154 of user interface 150 to provide visual or audible notifications of the system operation to a user. One of ordinary skill in the art will recognize that a wide variety of user interfaces may be employed in conjunction with the exemplary embodiments disclosed herein without departing from the scope hereof. Additionally, the system may include a network communications interface 160 that enables the smart system to transfer data to and from remote devices that may employ and implement one of a wide variety of network communications protocols without departing from the scope hereof.

In certain embodiments, the system includes a plurality of antennae 200 disposed in a spaced array 210 for detecting the product packages 1 that are suitably tagged, as will be discussed further herein below. Each of the antennae 200 is in some embodiments capable of reading or receiving data from an identification tag and transmitting or writing data or information to an identification tag as required during operation of the system. Each of the antennae 200 is electrically coupled to the inputs 102 and the outputs 104 so that the controller 100 controls the transmission and reception of data through each of the antennae 200, such that each of the antenna 200 is capable of transmitting to and receiving data from a single product, as will be discussed herein in greater detail. The spaced array 210 of the plurality of antennae 200 may be integrally formed and spaced on a printed circuit board in some embodiments, as is known in the art, without departing from the scope hereof.

In some aspects, the plurality of antennae 200 transmit and receive data on radio-frequency wavelengths suitable for use in RFID applications, while in other embodiments, the plurality of antennae 200 transmit and receive near-field communications data. In other embodiments, the plurality of antennae 200 are selected to transmit and receive data to and from a tagged product package placed proximate the plurality of antennae 200 to enable the controller 100 of the system to track packages as well as provide data to the individual product packages 1.

Figure 2:
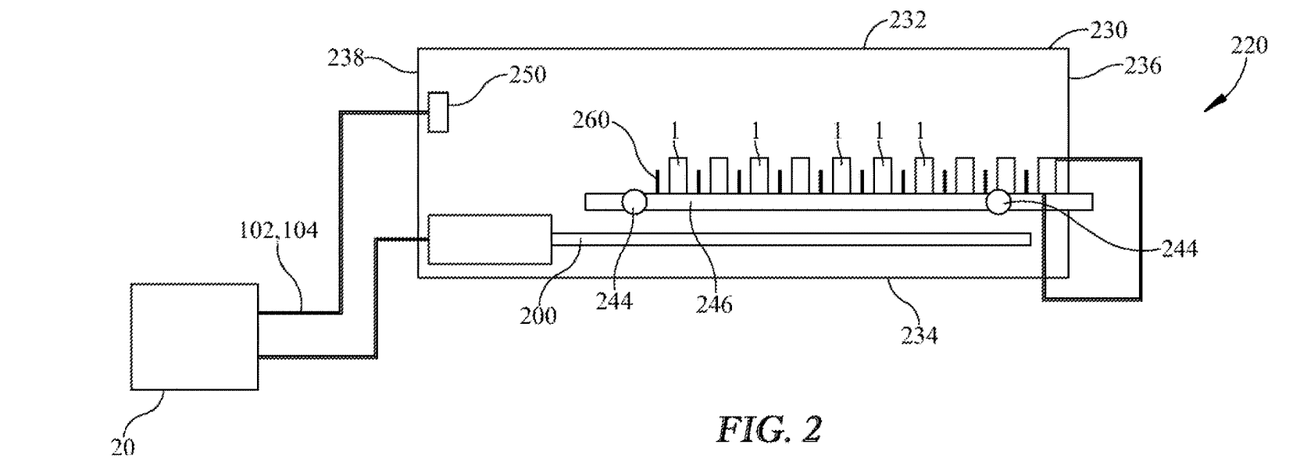
FIG. 2 illustrates an exemplary product display system for implementing embodiments and features of the present disclosure.
Figure 3:
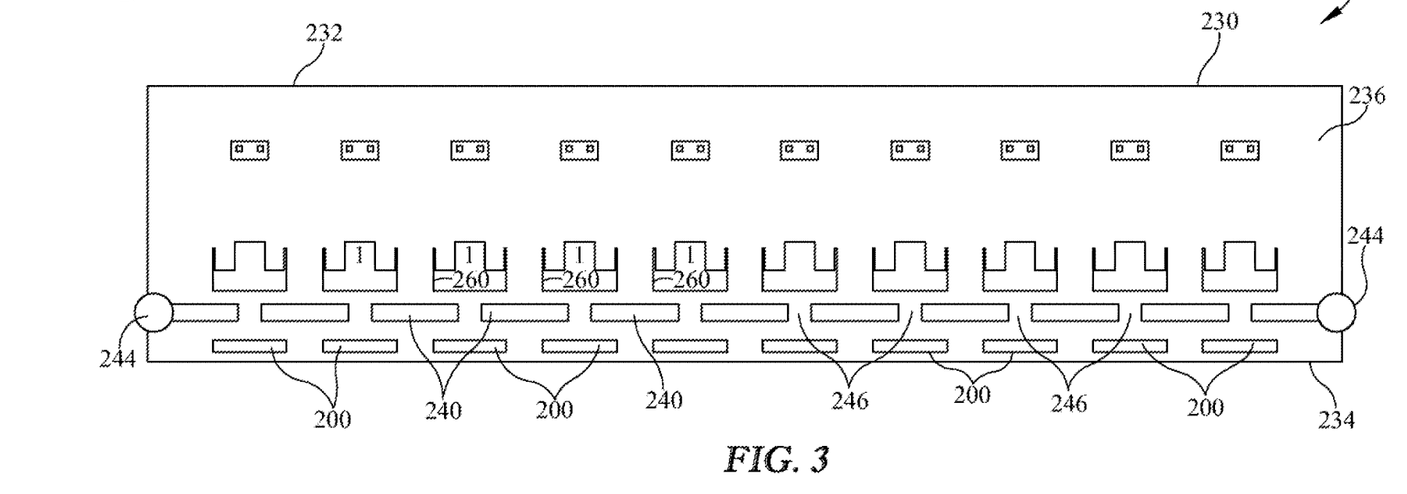
FIG. 3 illustrates an exemplary product display system for implementing embodiments and features of the present disclosure.

As best seen in FIGS. 2 and 3, and in accordance with some aspects, the smart system may include a product display 220 for positioning products for tracking and retail sale purposes. In various embodiments, the plurality of antennae 200 may be disposed in the spaced array 210 proximate the product display 220, whereby a product display shelf 240 contains or holds the product packages 1 for display or retail purposes. The product display 220, which may also be called a "smart display" in some embodiments, may include a drawer 230 having a top 232, a bottom 234, a front 236, and a back 238, and further having a shelf 240 that may be disposed on rollers 244, such that the shelf 240 may be moved forward and back within the drawer 230 and is removable. The front 236 of the product display 220 may be hinged or capable of folding down or out such that the shelf 240 may be pulled or slid out through the front 236 of the drawer 230 to enable ease of restocking the shelf 240 of the product display 220. While the exemplary embodiments shown in the drawings depict the shelf 240 or rack, the exact construction of product display may actually include a wide variety of display formats such as kiosks, shelving, product recesses, racks, and other structures, as long as the spaced array 210 of the plurality of antennae 200 is properly positioned with respect to the product packages 1 for reading/writing data to the product packages 1, as set forth in detail herein below.

In accordance with some aspects, the drawer 230 may be constructed of wood, cardboard, plastic, or some other non-metallic material to avoid electromagnetic interference with the plurality of antennae 200 during operation of the system. Furthermore, in some embodiments, the shelf 240 may be constructed of a plastic or other non-metallic material also to avoid electromagnetic interference with the plurality of antennae 200 during operation of the system. Furthermore, as best seen in FIG. 3, the shelf 240 may be constructed of a plastic material having a plurality of slots 246 positioned therein, the slots 246 being generally disposed between the plurality of antennae 200 and the product packages 1 when the shelf 240 is in a "home" position within the drawer 230 to facilitate data read/write between the control system 20 and each of the product packages 1. In further aspects and embodiments, the spaced array 210 of the plurality of antennae 200 may be positioned such that each of the plurality of antennae 200 is disposed proximate the potential location of each of the product packages 1, or a series of rows or columns of packages, to facilitate data transmission between the plurality of antennae 200 and the product packages 1.

In some embodiments, the drawer 230 is constructed of wood or wood-based composite material such as particle board. In other embodiments, the shelf 240 is constructed of a thin acrylic material sufficient to support the weight of the product packages 1, but thin enough to permit low-power NFC data communication via the plurality of antennae 200. A plurality of spaced product dividers 260 or holders, for example racks, or partitions, may be provided to positively position the product packages 1 in locations on the shelf 240 that are proximate the plurality of antennae 200 in the spaced array 210, so that each of the product packages 1 is positioned in NFC communication range with at least one of the plurality of antennae 200 when the drawer 230 is in its home or terminal position, as depicted in FIGS. 2 and 3. In these embodiments, the antennae 200 are spaced a predetermined distance from a plurality of the product packages 1 to enable properly equipped product packages 1 to be communicated with wirelessly via NFC, as discussed in detail below. In other embodiments, the shelf 240 includes the plurality of spaced product dividers 260 that act to space and arrange the product packages 1 in ten rows of ten packages each such that 100 packages are provided per the product display 220, although one of ordinary skill will recognize that any number of the product packages 1 may be organized in a given display using the inventive concepts and embodiments disclosed herein.

Figure 4:
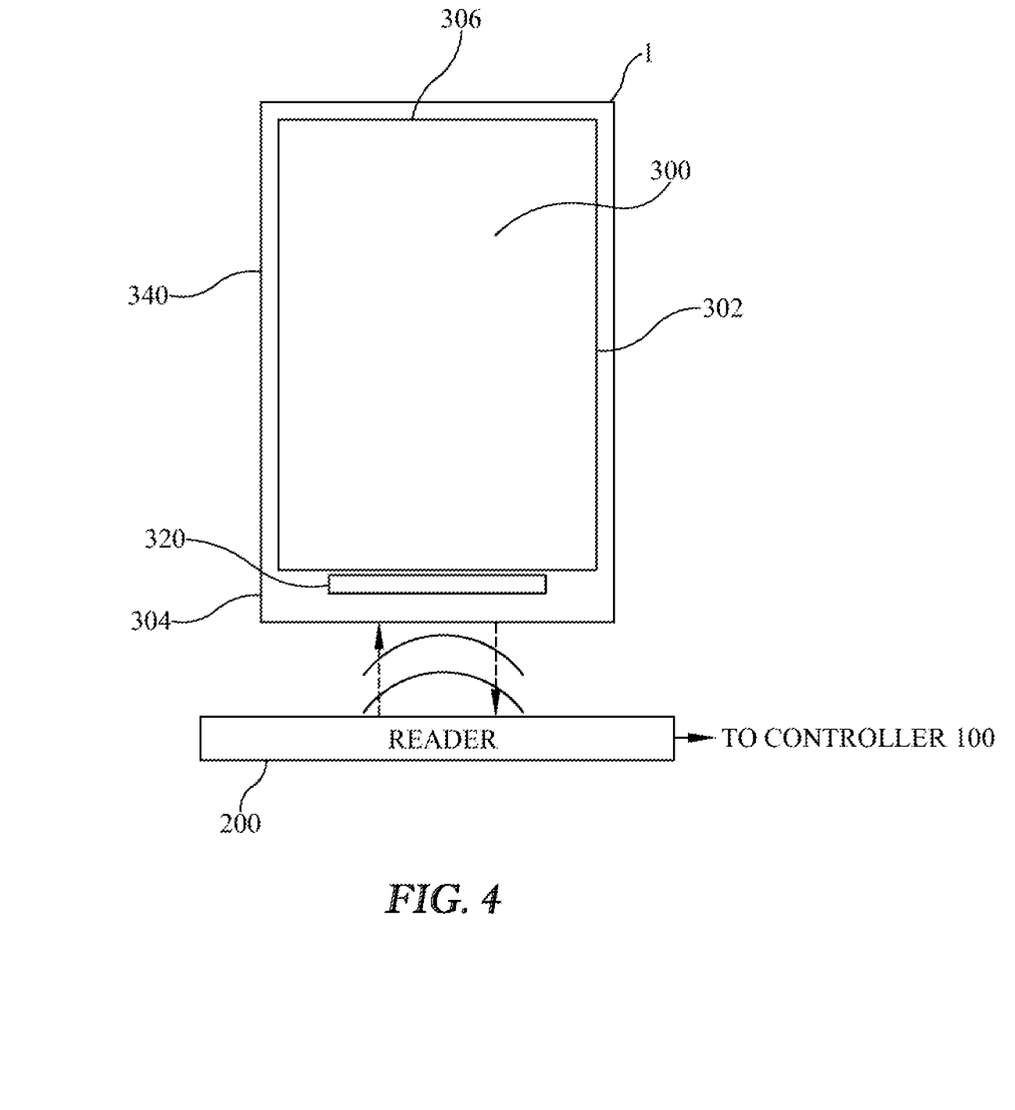
FIG. 4 illustrates an exemplary packaging system for implementing embodiments and features of the present disclosure.
Figure 5:
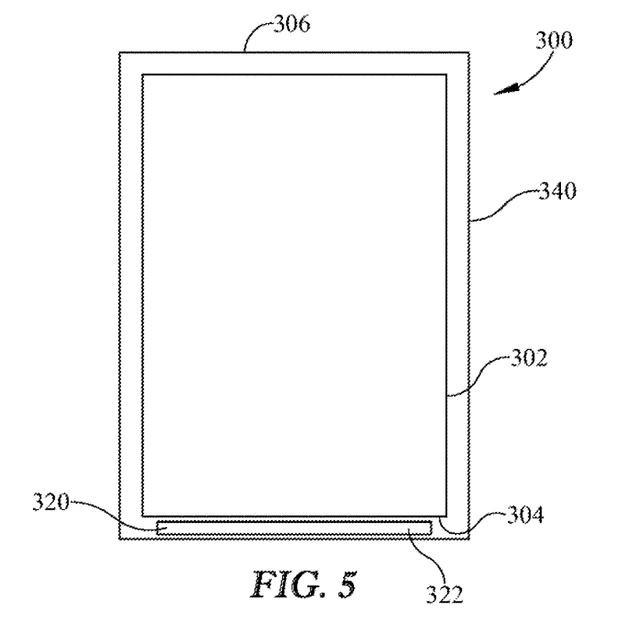
FIG. 5 illustrates an exemplary packaging system for implementing embodiments and features of the present disclosure.

Referring now to FIGS. 4 and 5, and in accordance with various embodiments, a packaging system 300 includes an inner product package 302, which may include a wide variety of material wrappers that enclose a product. The inner product package 302 includes a bottom side 304 and a top side 306. In various exemplary but non-limiting embodiments, the product that is enclosed in the packaging system 300 may be cigarettes, commonly packaged and sold in 20 unit packages per carton, although a wide variety of products may employ the packaging system 300. In cigarette-related embodiments, the inner product package 302 is often constructed of a thin metal foil to ensure product freshness. In these embodiments, it is useful to employ a product identification tag 320 that is suitable for use proximate such a metal foil layer that often causes a radio-frequency screening effect when trying to read and write to the tag 320 placed on or near the inner product package 302.

In accordance with some embodiments and aspects, the tag 320, for example a radio frequency identification (RFID) tag, is provided on the bottom side 304 of the inner product package 302 and secured thereto with an adhesive layer 322, or the equivalent, such that each system has a unique ID tag. RFID tags may comprise a wide variety of identification tags, such as conventional Silicon-based RFID (Si RFID) chips, or reverse-on-metal RFID chips in exemplary embodiments. In some aspects, wherein the inner product package 302 includes a foil layer or a metallic layer. Furthermore, in the embodiments where the inner product package 302 includes a foil layer, conventional passive RFID tags can be damaged, since a possible potential difference is created across each of the plurality of antennae 200, thereby shorting the antennae 200 and damaging the tag 320. Accordingly, in some of these embodiments, a reverse-on-metal RFID tag 320 may be used, wherein the tag 320 has an insulating layer disposed between the tag itself and the foil or metallic area to which the tag 320 is secured. These "reverse-on-metal" RFID tags are suitable for use in embodiments where the inner product package 302 is made of foil and forms part of the packaging system 300.

Referring again to FIGS. 4 and 5, an outer product package 340 or outer product wrapper that encloses at least a portion of the inner product package 302 is also provided. In some embodiments, the outer product package 340 completely encloses the inner product package 302, thereby situating the tag 320 between the inner product package 302 and the outer product package 340. In various embodiments, the outer product package 340 is constructed of paper, cardboard, or any of various thin material, thereby reducing electromagnetic interference between the tag 320 and the antennae 200. Furthermore, in some aspects, the adhesive layer 322 may be provided between the tag 320 and the outer product package 340, thereby positively affixing the tag 320 to the packaging system 300. Furthermore, while the embodiments depicted in the Figures show the tag 320 positioned on the bottom 304 of the inner product package 302, it is understood that the tag 320 may be positioned in various locations between the inner product package 302 and the outer product package 340, as long as the packaging system 300 is oriented to located the tag 320 proximate each of the plurality of antennae 200 to enable NFC read/write capability.

In some exemplary embodiments, a printed RFID tag 320 may be secured at a predetermined location between the inner product package 302 or inner product wrapper and the outer product package 340 or outer product wrapper. Other types of tags that may be employed without departing from the scope of the invention. Other types of tags that may be employed include, but are not limited to, UHF, HF, LF, glass, rubber, metal, and reverse-on-metal tags. In other embodiments, a reverse-on-metal tag 320 may be used in the packaging system 300 having a dimension of 1.8×3.5 cm.

Figure 6:
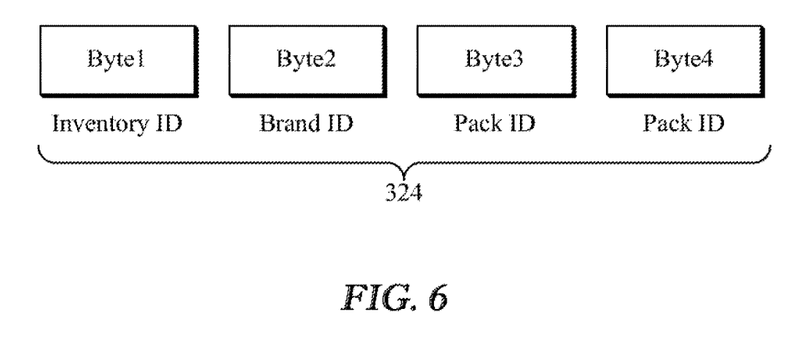
FIG. 6 illustrates an exemplary identification tag data structure for implementing embodiments and features of the present disclosure.

Referring now to FIG. 6 and in accordance with some embodiments, the tag 320 may include a data memory 324 capable of storing information supplied by NFC communication with the control system 20 that permits the system to track and manage the product packages 1 that are equipped with the packaging system 300. For example, the data memory 324 may have as little as four (4) bytes of storage and can be included as an integral part of the tag 320 to identify and track a plurality of the product packages 1. Each byte of memory can, in some aspects, be assigned to correspond to a product identifier which can include, but is not limited to, inventory identifications, product brand identifications, package identifications, market information, market geographical information, product manufacturing dates, and even marketing information related to the product packages 1 that the manufacturer wishes to be associated with the packaging system 300. In some exemplary aspects as shown in FIG. 5, a non-limiting embodiment can include an inventory identification (ID) number, a brand identification where required, and a plurality of pack identifications where required. One of ordinary skill will recognize that almost any type or category of data may be written to and thus read from the packaging system 300 without departing from the scope thereof.

In operation, the product packages 1 equipped with the packaging system 300 are disposed or positioned in the product display 220 such that at least one of the plurality of antenna 200 is in near-field communication distance with the packaging system 300, or a row thereof, to enable data transmission between the control system 20 and the packaging system 300. When placed in the product display 220, each of the product packages 1 is positively positioned using the plurality of spaced product dividers 260, so that the packaging system 300 is oriented in the drawer 230, such that the tag 320 is positioned downwardly, in proximate spaced relation to each of the plurality of antennae 200 to enable data transmission. At periodic predetermined intervals, or as initiated by a user, the controller 100 may periodically read/write data to and from each of the product packages 1 located in the product display 220, thereby tracking each of the product packages 1 sold and/or replaced or removed from the product display 220. In some aspects, a proximity sensor 250 or limit switch may be secured to the product display 220 proximate and/or at an edge or end of the shelf 240. The proximity sensor 250 may have an output operably connected to the input 102 of the controller 100 that is used to indicate when the drawer 230 of the shelf 240 is placed in its "home" or terminal position, whereby the controller 100 can then initiate a read/write data transmission to check the status of each of the slots 246 in the product display 220 for purposes of inventory tracking.

When the control system 20 "reads" the packaging system 300 in a particular location that has new or updated data in the data memory 324 that doesn't match with the prior packaging system 300 placed in that location, the packaging system 300 thus concludes that a new product has been placed in this location and thus notes the presence of a re-stocked package. Furthermore, in various embodiments, wherein the packaging system 300 is absent or missing from the drawer 230, each of the plurality of antennae 200 will not be capable or reading or writing data to that particular system 300, and thus the control system 20 will denote that the packaging system 300 is missing from the product display 220. This missing product packaging system 300 may be denoted as a sold product, thereby allowing the control system 20 to increment the number of units sold for inventory tracking purposes as well as record which specific product was sold by storing its product identification data from its identification tag.

Figure 7:
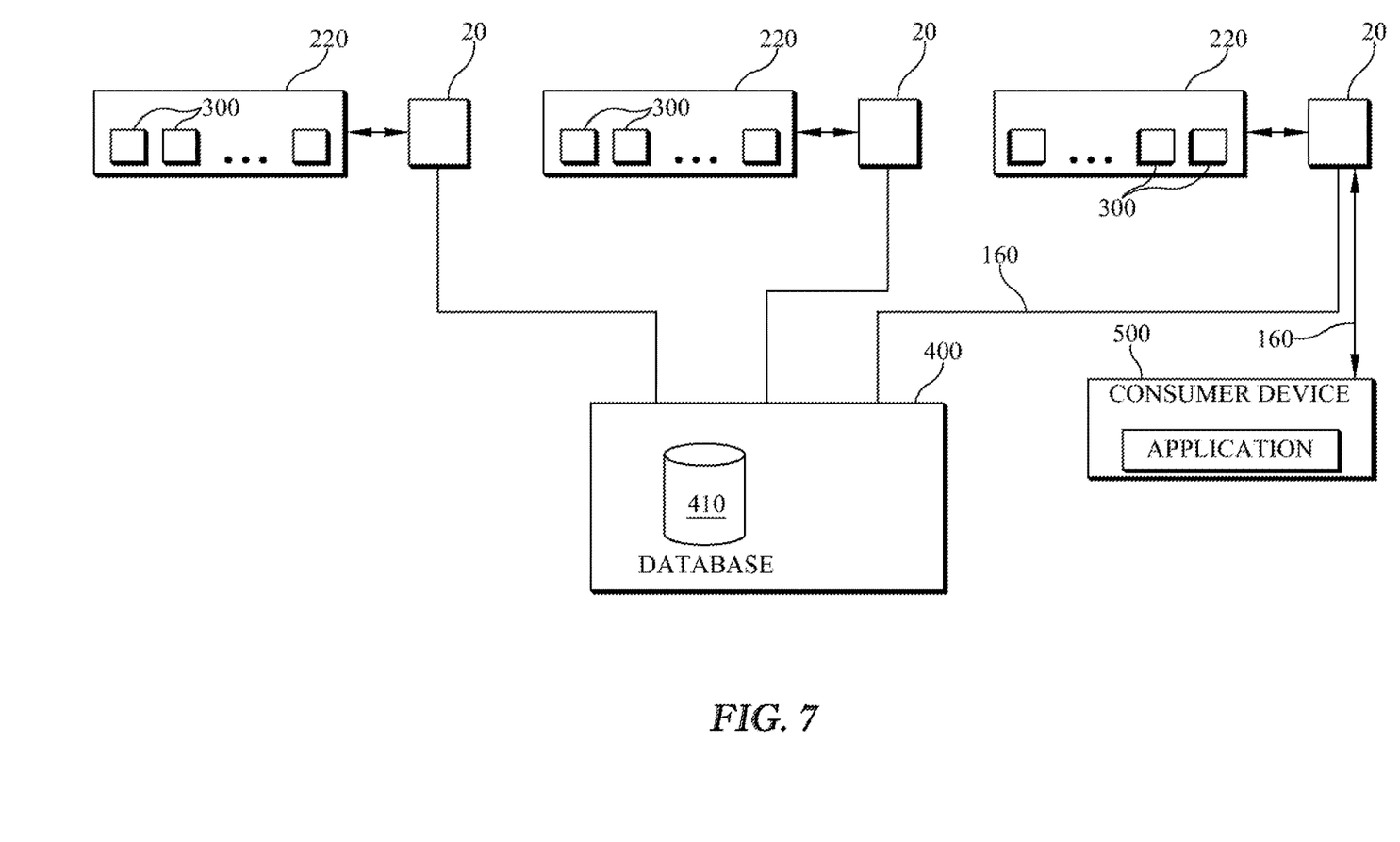
FIG. 7 illustrates an exemplary system for implementing embodiments and features of the present disclosure.

Referring to FIG. 7 and in accordance with some embodiments, a server 400, or a plurality thereof, is provided to collect information provided from a plurality of the product displays 220 having a plurality of the packaging system 300 contained therein to track or inventory a wide geographical range of products. The server 400 may include therein the concomitant data storage 110 memory in a database 410 that stores and tracks, via an application, all data from the packaging system 300 in the system. The server 400 may be networked to communicate with each of the product displays 220 via a wired or wireless network communications connections as is known in the art. The database 410 may be used to store and track data from each of the packaging systems 300 in the data memory 324, including data that is read from and/or written to each of the packaging systems 300.

When a particular product is sold or otherwise removed from the product display 220, at the next sequential data transfer from the control system 20, each of the packaging systems 300 that is missing may be recorded as a sale, and the data previously written to each of the packaging systems 300 (inventory ID, brand ID, pack ID, etc.) may then be transmitted to the server 400 database 410 to indicate a sale (or other disposal) of the particular product. As can be seen from the foregoing description, each of the product packages 1 equipped with the packaging system 300 are readily tracked and monitored throughout the retail process, thereby providing the system that is particularly suited to inventory control for small, but valuable, product packages 1.

In some aspects, the control system 20 communications interface 160 may include a Bluetooth or other wireless communications link that provides relevant product data based upon each of the packaging systems 300 present in the product display 220. In these embodiments, a user equipped with a consumer device 500 that is equipped with a Bluetooth system or equivalent communications interface 160 may, when in proximity to the product display 220, be provided with product information and updates via the controller 100 of the control system 20. For example, a consumer with the consumer device 500, such as a smart phone, may be able to be informed of where a particular product is sold in proximity to the consumer's current location. Other product relevant marketing information and advertising information concerning the product may also be written to individual packaging systems 300 and then provided through the communications interface 160 of the control system 20 to the consumer device 500 or similar remote user. This feature may be particularly suited for use in the tobacco products markets. For example, in many jurisdictions, commonly referred to as "dark markets", retail marketing and display of tobacco product advertising is highly regulated and restricted. The product display 220 and the packaging system 300 enable the dissemination of marketing information to users who want it via wireless transmission to a nearby suitably equipped device without the necessity for advertising displays that may be prohibited. In some exemplary, but non-limiting embodiments, information, such as brand types, product types, marketing information, and retail sales locations, may be disseminated to the consumer device 500 via the communications interface 160 of the control system 20 without any input or action required by a retailer or sales outlet.

Other embodiments of the disclosure will be apparent to those skilled in the art from consideration of the specification and practice of the embodiments disclosed herein. It is intended that the specification and examples be considered as exemplary only, with a true scope and spirit of the disclosure and exemplary embodiments being indicated by the following claims.

What is claimed is:

1. A smart display system for a plurality of product packages comprising:
    a product display comprising a display shelf having a plurality of product package locations for positively locating said plurality of product packages on a first side of said display shelf and a plurality of openings in said display shelf, said display shelf further comprising a drawer movable from a home position in said product display;
    a sensor for determining when said drawer has been placed in said home position; and
    a control system comprising a processor, a concomitant memory, a plurality of inputs and outputs operatively connected to said processor, a user interface, and a plurality of near-field communication antennae operatively connected to said processor, wherein each of said plurality of near-field communication antennae is positioned proximate a respective one of said plurality of product package locations and each of said plurality of openings in said display shelf at a second side of said display shelf that is opposite said first side of said display shelf;
    wherein each of said plurality of product packages has an identification tag capable of near-field communication with one of said plurality of near-field communications antennae, each of said identification tags being secured to a respective one of the plurality of product packages at positions proximate a respective one of said plurality of near-field communication antennae when each of said plurality of product packages are positioned in a respective one of said plurality of product package locations;
    wherein said processor is configured to transmit and receive data to and from the identification tag of each of said plurality of product packages when said drawer is placed in said home position.

2. The smart display system of claim 1, wherein said display shelf comprises:
    a plurality of slots for holding each of said plurality of product packages in spaced relation with said near-field communication antennae, wherein each of said plurality of product packages are of a predetermined shape.

3. The smart display system of claim 1, wherein said control system transmits and receives product identification data to and from said identification tag at periodic intervals.

4. The smart display system of claim 3 further comprising:
    a communications interface operably connected to said processor; and a server having a concomitant database in communication with said processor for collecting said product identification data.

5. The smart display system of claim 1, wherein said identification tag includes data relating to at least one of an inventory identification, a brand identification, and a pack identification; and
wherein said processor transmits said data to said server at predetermined intervals.

6. The smart display system of claim 4, wherein said processor denotes a missing product package as a sold product; and
wherein said processor transmits data representing sold products to said server.

7. The smart display system of claim 1, wherein said identification tag includes data related to product marketing information.

8. The smart display system of claim 1, wherein said display shelf comprises a non-metallic material.

9. A smart display system for a plurality of product packages comprising:
a product display having a display shelf with a plurality of product package locations disposed thereon for positively positioning each of said plurality of product packages, said display shelf being moveable between a home position and a forward position, said forward position being an extended position that facilitates restocking of product packages;
a control system having a processor, a concomitant memory, a plurality of inputs and outputs operatively connected to said processor, a user interface, and a near-field communication antenna operatively connected to said processor; and
a proximity sensor comprising an output operably connected to said control system, said proximity sensor being configured to detect said display shelf being moved into said home position and communicate said detection of the display shelf being moved into said home position to said processor of said control system;
wherein said processor is configured to initiate a read operation via said near-field communication antennae to determine presence or absence of said product packages in said plurality of product package locations in response to receiving said communication from said proximity sensor indicating detection of said display shelf being moved into said home position;
wherein said near-field communication antenna is positioned proximate said plurality of product package locations.

10. The smart display system of claim 9 further comprising:
each of said plurality of product packages having an identification tag capable of near-field communication secured at a predetermined location thereto, said identification tag being positioned proximate said near-field communication antenna when each of said product packages are positioned in a respective one of said plurality of product package locations.

11. The smart display system of claim 10 further comprising:
a communications interface operably connected to said processor; and
a server having a concomitant database in communication with said processor for collecting product identification data.

12. The smart display system of claim 11, wherein said identification tag includes data relating to at least one of an inventory identification, a brand identification, and a pack identification; and
wherein said processor transmits said product identification data to said server at predetermined intervals.

13. The smart display system of claim 12, wherein said identification tag includes data relating to product marketing and advertising, and wherein said processor includes a communication link for providing said marketing and advertising information to a remote user.

14. The smart display system of claim 9 further comprising:
each of said plurality of product packages having a radio-frequency identification tag secured at a predetermined location thereto, said radio-frequency identification tag being positioned proximate said near-field communication antenna when each of said product packages are positioned in a respective one of said plurality of product package locations.

15. The smart display system of claim 9 further comprising:
each of said plurality of product packages having a reverse-on-metal radio-frequency identification tag secured at a predetermined location thereto, said reverse-on-metal radio-frequency identification tag being positioned proximate said near-field communication antenna when each of said product packages are positioned in a respective one of said plurality of product package locations.

16. The smart display system of claim 9 further comprising:
each of said plurality of product packages having an radio-frequency identification tag secured at a predetermined location thereto, the radio-frequency identification tag being positioned proximate said near-field communication antenna when said product package is positioned in said at least one product package location when each of said product packages are positioned in a respective one of said plurality of product package locations.

17. The smart display system of claim 9 further comprising:
each of said plurality of product packages having a near-field communication identification tag secured at a predetermined location thereto, said near-field communication identification tag being positioned proximate said near-field communication antenna when each of said product packages are positioned in a respective one of said plurality of product package locations.

18. A method for displaying and tracking a product in a smart display system comprising:
providing a product display comprising a display shelf with a plurality of product package locations disposed on a first side of said display shelf for positively positioning each of a plurality of product packages;
providing a control system comprising a processor, a concomitant memory, a plurality of inputs and outputs operatively connected to said processor, a user interface, and a near-field communication antenna operatively connected to said processor;
providing a drawer of said display shelf removable from a home position in said product display and a sensor for determining when said drawer has been placed in said home position,
positioning said near-field communication antenna proximate said plurality of product package locations at a second side of said display shelf, said second side of said display shelf being opposite said first side of said display shelf, wherein said display shelf comprises an opening positioned between said near-field communication antenna and said plurality of product package locations;

providing an identification tag for each of said plurality of product packages, said identification tag capable of near-field communication with said near-field communication antenna, said identification tag being secured at a predetermined location on each of said plurality of product packages, said identification tag being positioned proximate said near-field communication antenna when each of said product packages are positioned in a respective one of said plurality of product package locations;

transmitting and receiving data, via said control system, to and from each of said plurality of identification tags on said product packages when said drawer is placed in said home position, wherein said received data comprises identification tag data; and storing said identification tag data read from each of the identification tags by said control system via said near-field antenna for each of said plurality of product packages.

19. The smart display system of claim 1 wherein said openings in said display shelf comprise slot openings.

* * * * *